(12) United States Patent
Ootsuki

(10) Patent No.: US 12,436,377 B2
(45) Date of Patent: Oct. 7, 2025

(54) CONTROL DEVICE, CONTROL SYSTEM, AND CONTROL METHOD FOR OPHTHALMIC SURGERY

(71) Applicant: SONY GROUP CORPORATION, Tokyo (JP)

(72) Inventor: Tomoyuki Ootsuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 19 days.

(21) Appl. No.: 18/262,450

(22) PCT Filed: Dec. 24, 2021

(86) PCT No.: PCT/JP2021/048294
§ 371 (c)(1),
(2) Date: Jul. 21, 2023

(87) PCT Pub. No.: WO2022/163268
PCT Pub. Date: Aug. 4, 2022

(65) Prior Publication Data
US 2024/0103260 A1     Mar. 28, 2024

(30) Foreign Application Priority Data

Jan. 29, 2021 (JP) .................................. 2021-012602

(51) Int. Cl.
*G02B 21/00* (2006.01)
*A61F 9/007* (2006.01)
(Continued)

(52) U.S. Cl.
CPC ............ *G02B 21/365* (2013.01); *A61F 9/007* (2013.01); *G02B 21/0012* (2013.01); *G06T 7/74* (2017.01);
(Continued)

(58) Field of Classification Search
CPC .... G02B 21/365; G02B 21/0012; G06T 7/74; G06T 2207/10056; G06T 2207/10101;
(Continued)

(56) References Cited

U.S. PATENT DOCUMENTS 6,470,069 B1 * 10/2002 Muller ..................... A61B 6/51
378/38
9,772,679 B1 * 9/2017 Schiewe ............... G06F 3/0346
(Continued)

FOREIGN PATENT DOCUMENTS

| WO | 2017/065018 A | 4/2017 | |
| WO | 2018/207466 A1 | 11/2018 | |
| WO | WO2018207466 | * 11/2018 | ............... A61B 3/10 |

OTHER PUBLICATIONS

International Search Report and Written Opinion of PCT Application No. PCT/JP2021/048294, issued on Mar. 22, 2022, 25 pages of ISRWO.

*Primary Examiner* — James T Boylan
(74) *Attorney, Agent, or Firm* — CHIP LAW GROUP

(57) ABSTRACT

A control device includes an acquisition unit that acquires a microscopic image in surgery for placing an implant in an eye, an estimation unit that estimates a situation of a surgical field based on an acquisition result of the acquisition unit, and an imaging control unit that controls imaging such that a tomographic image including the implant is captured based on an estimation result of the estimation unit.

17 Claims, 17 Drawing Sheets

(51) Int. Cl.
*G02B 21/36* (2006.01)
*G06T 7/73* (2017.01)

(52) U.S. Cl.
CPC ............... *G06T 2207/10056* (2013.01); *G06T 2207/10101* (2013.01); *G06T 2207/30041* (2013.01); *G06T 2207/30052* (2013.01)

(58) Field of Classification Search
CPC . G06T 2207/30041; G06T 2207/30052; A61F 9/007
See application file for complete search history.

(56) References Cited

U.S. PATENT DOCUMENTS

| | | | | |
|---|---|---|---|---|
| 2017/0280993 | A1* | 10/2017 | Fukuhara | ................ A61B 3/102 |
| 2018/0008139 | A1* | 1/2018 | Ootsuki | .............. A61F 9/00736 |
| 2019/0204243 | A1* | 7/2019 | Kang | ..................... G01V 5/226 |

* cited by examiner

CONTROL DEVICE, CONTROL SYSTEM, AND CONTROL METHOD FOR OPHTHALMIC SURGERY

CROSS REFERENCE TO RELATED APPLICATIONS

This application is a U.S. National Phase of International Patent Application No. PCT/JP2021/048294 filed on Dec. 24, 2021, which claims priority benefit of Japanese Patent Application No. JP 2021-012602 filed in the Japan Patent Office on Jan. 29, 2021. Each of the above-referenced applications is hereby incorporated herein by reference in its entirety.

FIELD

The present disclosure relates to a control device, a control system, and a control method.

BACKGROUND

It is known that implants are used for treatment of ophthalmic diseases and the like (see, for example, Patent Literature 1).

CITATION LIST

Patent Literature

Patent Literature 1: WO 2018/207466 A

SUMMARY

Technical Problem

For example, a tomographic image is used to confirm an implant placed in a hidden manner in a tissue that does not transmit visible light. There remains a problem in identifying an imaging point for obtaining the tomographic image appropriately including the implant.

One aspect of the present disclosure provides a control device, a control system, and a control method that enable capturing of a tomographic image appropriately including an implant.

Solution to Problem

A control device according to one aspect of the present disclosure includes: an acquisition unit that acquires a microscopic image in surgery for placing an implant in an eye; an estimation unit that estimates a situation of a surgical field based on an acquisition result of the acquisition unit; and an imaging control unit that controls imaging such that a tomographic image including the implant is captured based on an estimation result of the estimation unit.

A control system according to one aspect of the present disclosure includes: an imaging unit that captures a microscopic image and a tomographic image in a surgery for placing an implant in an eye; and a control device, wherein the control device includes an acquisition unit that acquires the microscopic image captured by the imaging unit, an estimation unit that estimates a situation of a surgical field based on an acquisition result of the acquisition unit, and an imaging control unit that controls the imaging unit such that the tomographic image including the implant is captured based on an estimation result of the estimation unit.

A control method according to one aspect of the present disclosure includes: acquiring, by a control device, a microscopic image in a surgery for placing an implant in an eye; estimating, by the control device, a situation of a surgical field based on an acquisition result; and controlling imaging, by the control device, such that a tomographic image including the implant is captured based on an estimation result.

DESCRIPTION OF EMBODIMENTS

Hereinafter, embodiments of the present disclosure will be described in detail with reference to the drawings. Note that the same portions are denoted by the same reference signs in each of the following embodiments, and a repetitive description thereof will be omitted.

The present disclosure will be described in the following item order.
1. Introduction
2. Embodiment
3. Example of Hardware Configuration
4. Modifications
5. Example of Effects

1. Introduction

The disclosed technology is used in ophthalmic surgery. An example of the ophthalmic surgery is the treatment of ophthalmic diseases. Implants are sometimes used in this surgery. The implants need to be placed at appropriate positions, but it is not possible to confirm whether a hidden portion is placed in an appropriate form with naked eyes or by microscopic observation using visible light with respect to an implant placed in a manner of being hidden in a tissue that does not transmit visible light. Whether or not an implant is appropriately placed is confirmed using a tomographic imaging device capable of seeing through many tissues including such a portion. However, it is difficult to simply and efficiently perform tomographic imaging of a placement situation of the implant with existing methods. This problem may be addressed by several disclosed techniques. Note that "imaging" may have a meaning encompassing "capturing" in the present disclosure.

2. Embodiment

Figure 1:
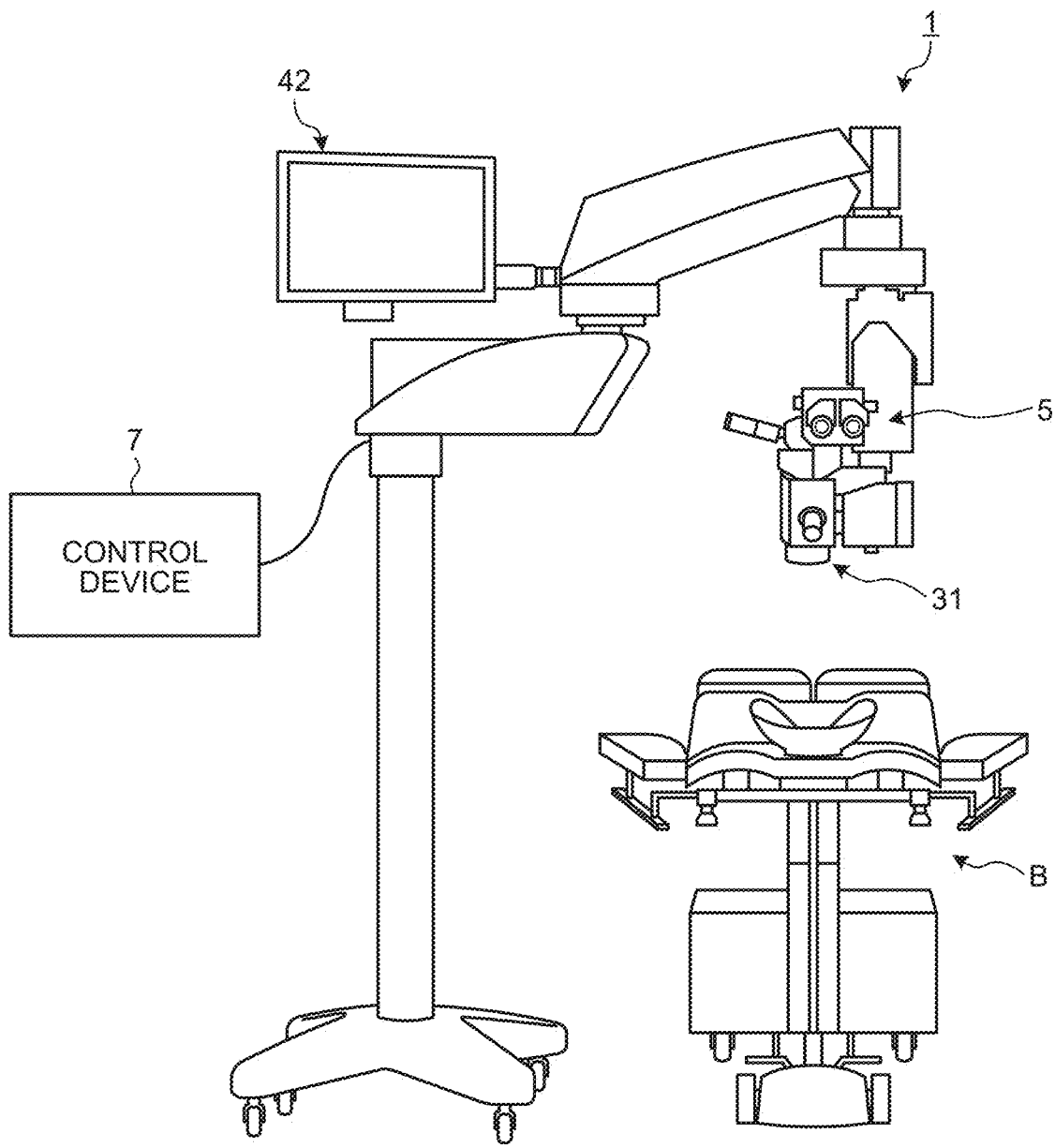
FIG. 1 is a diagram illustrating an example of a schematic configuration of a control system according to an embodiment.

FIG. 1 is a diagram illustrating an example of a schematic configuration of a control system according to an embodiment. An illustrated control system 1 is a surgical system used for surgery of an eye of a patient lying on a bed B. Examples of a user of the control system 1 include an operator such as a doctor and a medical staff who supports the operator.

A microscope device is used for the surgery. In FIG. 1, among components of the microscope device, an objective lens 31, an eyepiece lens 5, and an UI unit 42 (drawn as a monitor or the like in this example) are attached with reference signs. The operator looks into the eyepiece lens 5 and performs surgery by, for example, enlarging and observing a surgical site while referring to information displayed on the UI unit 42 as necessary. The surgical site is the eye of the patient in this example. Note that the UI unit 42 may be a component (for example, a separate body) different from the microscope device.

The control system 1 includes a control device 7 in addition to the above-described microscope device (the objective lens 31, the eyepiece lens 5, a presentation unit 41, and the like). The control device 7 performs overall control of the control system 1. Details will be described later with reference to FIG. 2 and its subsequent drawings.

Figure 2:
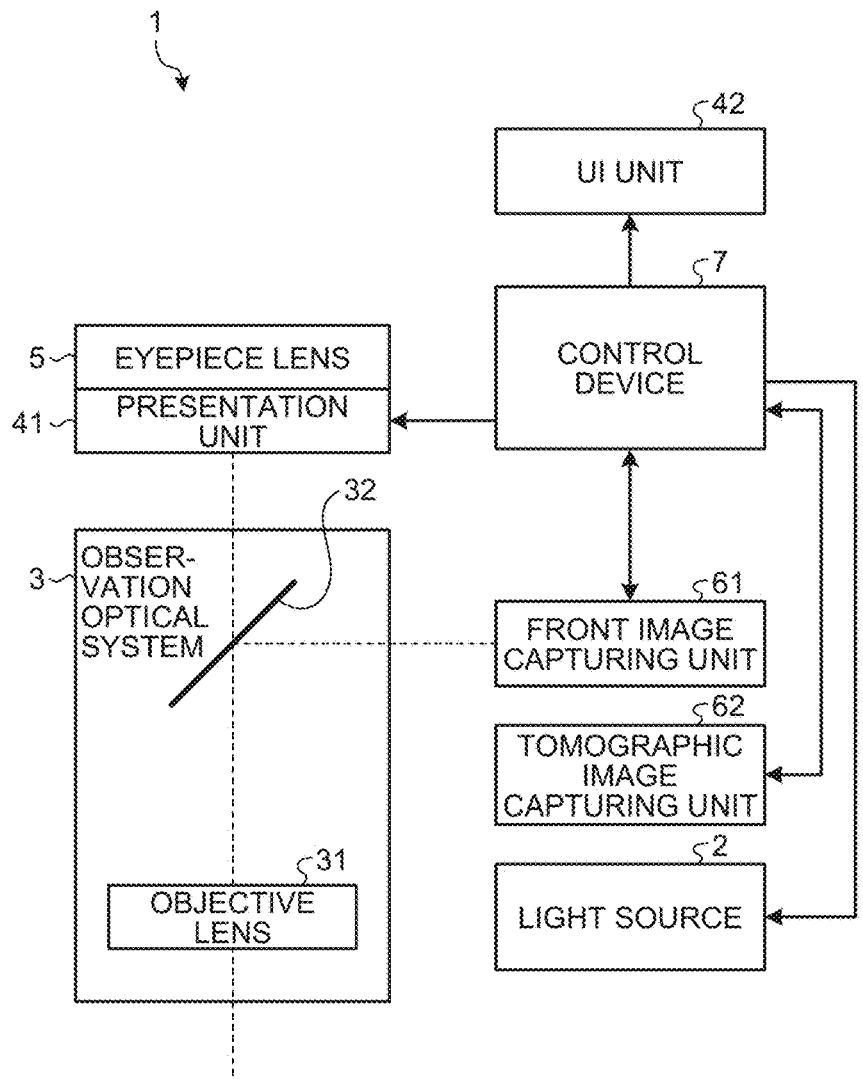
FIG. 2 is a diagram illustrating an example of a detailed configuration of the control system.

FIG. 2 is a diagram illustrating an example of a detailed configuration of the control system. The control system 1 includes a light source 2, an observation optical system 3, the presentation unit 41, a front image capturing unit 61, and a tomographic image capturing unit 62 in addition to the objective lens 31, the eyepiece lens 5, the UI unit 42 (an example of components of the microscope device), and the control device 7 described hereinbefore.

The light source 2 irradiates a surgical target region with illumination light to illuminate a surgical field. At least part of light (observation light) from the illuminated surgical field is incident on the objective lens 31 of the observation optical system 3. In this example, the observation optical system 3 includes the objective lens 31, a lens (not illustrated), and a half mirror 32. Part (for example, substantially half) of the observation light incident on the objective lens 31 is transmitted through the half mirror 32, further transmitted through the presentation unit 41 (the reason of which will be described later), and incident on the eyepiece lens 5. The remainder of the observation light is reflected by the half mirror 32 and reaches the front image capturing unit 61.

The eyepiece lens 5 collects the observation light to form an optical image of the surgical field. The formed optical image of the surgical field is observed by the operator looking through the eyepiece lens 5.

The presentation unit 41 and the UI unit 42 will be described. These are examples of a user interface that transmits and receives information to and from the user (operator or the like) of the control system 1.

The presentation unit 41 presents information to the operator looking into the observation optical system 3. In this example, the presentation unit 41 is a transmissive display device provided between the observation optical system 3 and the eyepiece lens 5. Therefore, the observation light from the half mirror 14 is transmitted through the presentation unit 41 and incident on the eyepiece lens 5 as described above. Information (an image and the like) that can be provided for surgery support is presented (displayed) by the presentation unit 41. The operator performs the surgery by observing the surgical field, and refers to the information presented by the presentation unit 41 as necessary.

The UI unit 42 presents information to the user and receives a user operation. The UI unit 42 includes the monitor as illustrated in FIG. 1 above, an operation panel (a controller, a remote controller, or the like) (not illustrated), and the like. The monitor may be a touch panel. In such a case, some or all of functions of the operation panel may be implemented by the monitor. In addition, the UI unit 42 may include various elements for transmission and reception of information with the user, such as a speaker, a microphone, and a lamp (a rotating lamp, an indicator lamp, or the like).

The front image capturing unit 61 and the tomographic image capturing unit 62 will be described. These are examples of an image capturing unit that acquires various images related to the surgery.

The front image capturing unit 61 captures a front image. The front image is an image obtained by observing the surgical site from the front, and is, for example, an image obtained by capturing an image of the eye of the patient from a substantially eye-axis direction. The front image may correspond to a surgical field image. The front image capturing unit 61 includes, for example, a video camera or the like.

The tomographic image capturing unit 62 captures a tomographic image. The tomographic image is a cross-sectional image of the surgical site, for example, an image of a cross section in a direction substantially parallel to the eye-axis direction of the eye of the patient. The tomographic image capturing unit 62 includes, for example, optical coherence tomography (OCT), a Scheimpflug camera, and the like. For example, the tomographic image is acquired by the interference principle using infrared light. An optical path of the infrared light at that time and a part of an optical path of the observation light in the observation optical system 3 may be shared.

The control device 7 controls the overall operation of the control system 1. Information necessary for control is appropriately transmitted and received between the control device 7 and other components. For example, the control device 7 adjusts an illumination position, luminance, and the like by controlling the light source 2. The control device 7 adjusts an observation position, magnification, and the like by controlling the observation optical system 3. The control device 7 presents information (image and the like) that can be provided for the surgery support to the operator by controlling the presentation unit 41. The control device 7 controls the UI unit 42 to receive the user operation and present the information (image or the like) that can be provided for the surgery support to the operator or the like. The control device 7 captures the front image and the tomographic image by controlling the front image capturing unit 61 and the tomographic image capturing unit 62.

The control system 1 as described above is applied to, for example, surgery for placing of an ophthalmic implant. As an example, the following description is given by exemplifying surgery of an implant for minimally invasive glaucoma surgery (MIGS) placed in the suprachoroidal space.

The implant placed in the suprachoroidal space aims to reduce the intraocular pressure by increasing the amount of aqueous humor discharged from the anterior chamber to the suprachoroidal space, which is one of outflow channels of aqueous humor, and to suppress the progression of glaucoma. If being appropriately placed, the implant fits within the suprachoroidal space to perform its aiming function (see, for example, FIG. 18 to be described below). On the other hand, when a placement position of the implant is shifted to the sclera side or the vitreous chamber side, not only the aimed function is not exhibited but also an injury may be caused. Therefore, there is a demand for confirmation that the implant has been appropriately placed by the operator.

So far, there is no method for simply and efficiently acquiring a tomographic image as a target when performing tomographic imaging such as OCT. This problem may be addressed by the disclosed technology. As a tomographic image suitable for the operator to confirm the implantation of the implant, for example, a tomographic image along the longitudinal direction of the implant (for example, FIG. 18 to be described later) may be captured and presented. However, a tomographic image along the lateral direction of the implant (for example, FIG. 16 to be described later) may be captured, or tomographic images along various other directions may be captured according to the preference of the operator or the like. Any tomographic image can be captured by estimating the placement position of the implant by the control system 1 (more specifically, an estimation unit 72 of the control device 7 to be described later).

Figure 3:
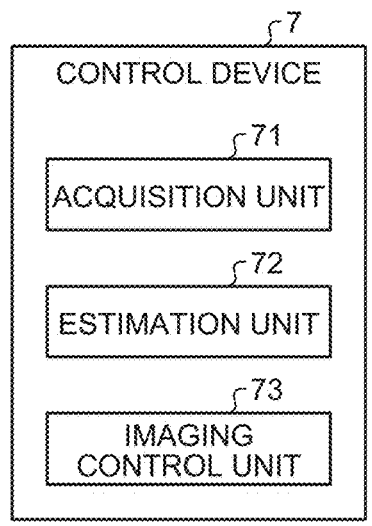
FIG. 3 is a diagram illustrating an example of a schematic configuration of a control device.

FIG. 3 is a diagram illustrating an example of a schematic configuration of the control device. The control device 7 includes an acquisition unit 71, the estimation unit 72, and an imaging control unit 73.

The acquisition unit 71 acquires a microscopic image. In this example, the microscopic image is a microscopic image (surgical field image) in the surgery for placing the implant in the eye. The implant is inserted, for example, into an angle region and placed therein. In this case, the implant is placed in a hidden manner in a tissue that does not transmit visible light. The microscopic image may be a captured image of the front image capturing unit 61.

Figure 4:
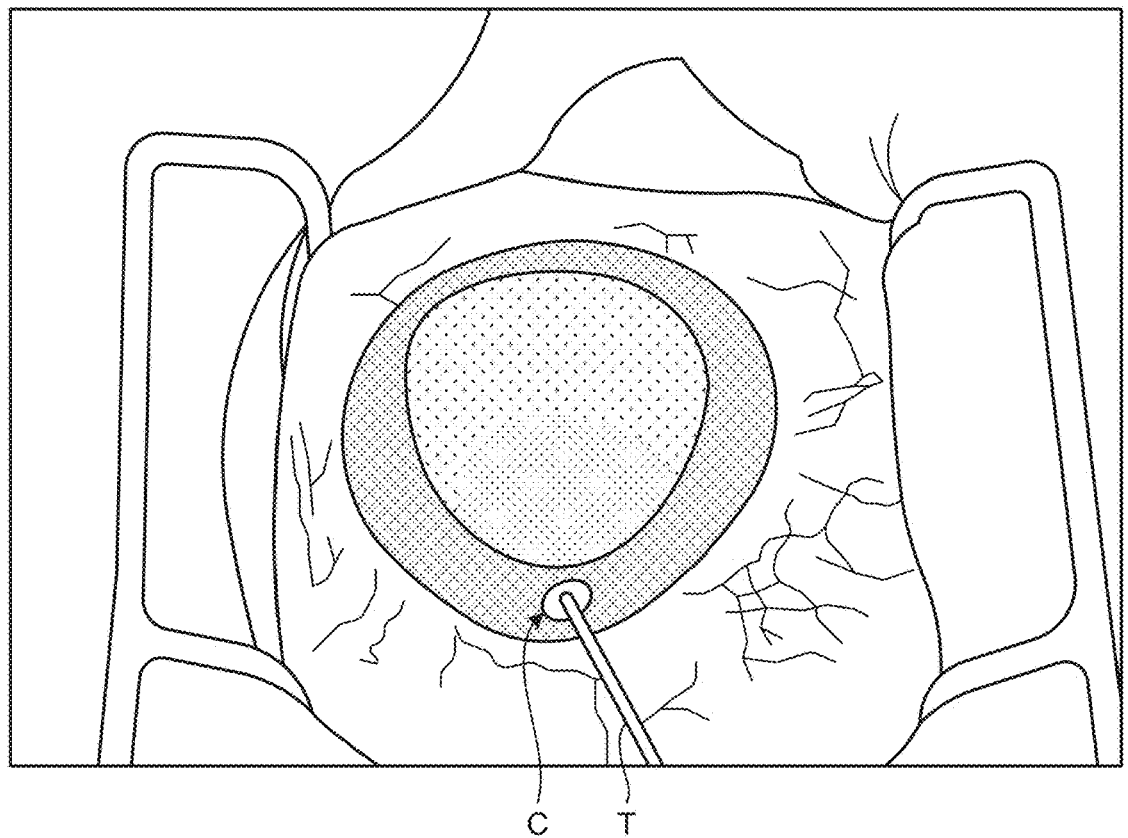
FIG. 4 is a view schematically illustrating an example of a microscopic image acquired by an acquisition unit.
Figure 5:
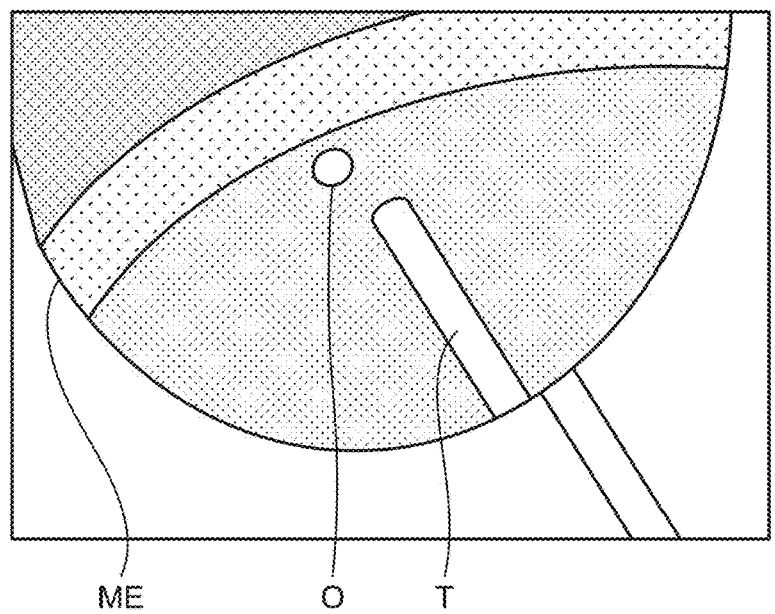
FIG. 5 is a view schematically illustrating an example of the microscopic image acquired by the acquisition unit.

FIGS. 4 and 5 are views schematically illustrating examples of microscopic images acquired by the acquisition unit. The microscopic image illustrated in FIG. 4 illustrates the surgical field in a state where a surgical tool T is inserted into an incision C. The incision C is formed by a knife or the like in order to insert the implant into the eye. The microscopic image illustrated in FIG. 5 illustrates the surgical field in a state where the implant is being inserted into the angle region. The angle region can be visually recognized by means of a gonioscope arranged on the eye and an opening O of the inserted implant is observed. An edge of the gonioscope is illustrated as an edge ME. The opening O is an opening at a rear end in an insertion direction of the implant.

Returning to FIG. 3, the acquisition unit 71 also acquires a tomographic image. The tomographic image may be a captured image of the tomographic image capturing unit 62. The acquisition of the tomographic image will be described again later.

The estimation unit 72 estimates a situation of the surgical field based on an acquisition result (the microscopic image and the tomographic image as necessary) of the acquisition unit 71. For the estimation, processing such as image recognition is used as necessary. For the image recognition, various known image recognition engines, image recognition models (learned models and the like), and the like may be used.

In one embodiment, the estimation unit 72 estimates a position of the implant. For example, the estimation unit 72 estimates the position of the implant by estimating a position of the opening O of the implant in the angle region. Various estimation methods to be described later can be employed. The difficulty of estimation varies depending on a type of the implant, a surgical style of the operator, and the like, and there is an estimation method suitable for the difficulty. Therefore, an estimation technique that can easily obtain high estimation accuracy may be appropriately selected and adopted. Some specific examples of the estimation method will be described.

FIGS. 6 to 9 are views schematically illustrating examples of estimation of the position of the opening of the implant. Illustrated microscopic images show the surgical field in a state in which the eye is fixed in an opened state by an eyelid opener E.

Figure 6:
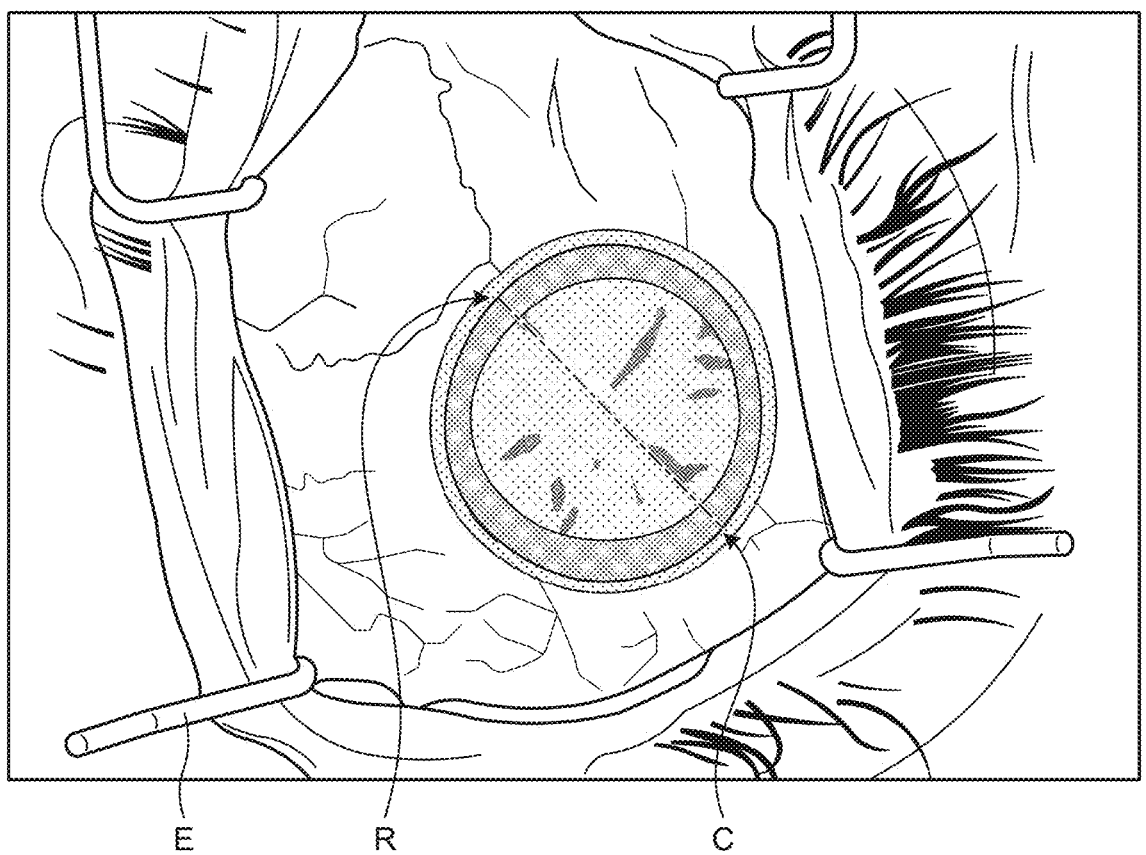
FIG. 6 is a view schematically illustrating an example of estimation of a position of an opening of an implant.

In the example illustrated in FIG. 6, the estimation unit 72 estimates an angle region R located at a position opposite to an incision with the corneal center interposed therebetween, as the position of the opening O, out of the angle region. This is because an implant insertion region is located on the opposite side of the incision C with the corneal center interposed therebetween in many cases. In FIG. 6, a line passing through the corneal center is indicated by a one-dot chain line.

Figure 7:
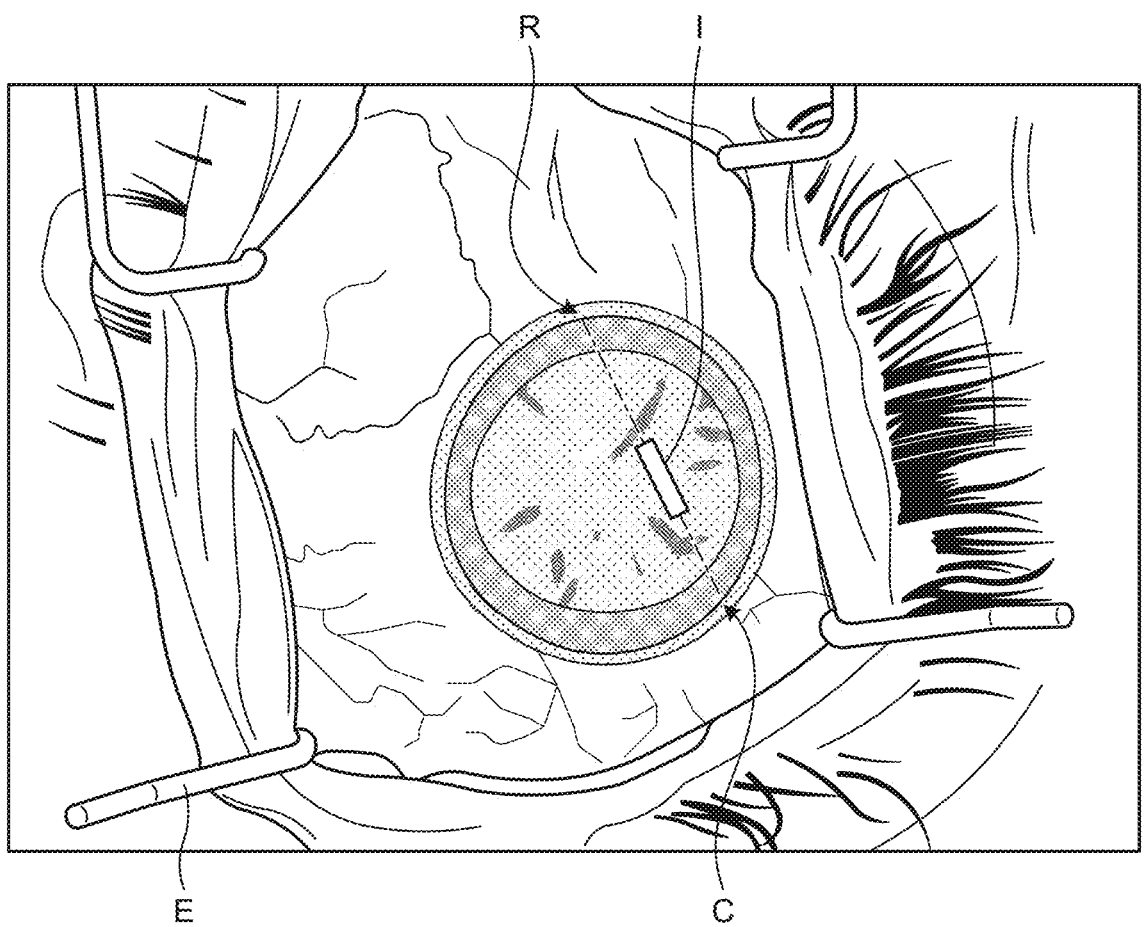
FIG. 7 is a view schematically illustrating an example of estimation of the position of the opening of the implant.

In the example illustrated in FIG. 7, the estimation unit 72 estimates, as the position of the opening O, the angle region R located on an extension line (illustrated by a one-dot chain line) in the progressing direction of an implant I when the implant I is inserted into the eye (at the time of insertion). This is because the implant I is inserted toward the implant insertion region in many cases.

Figure 8:
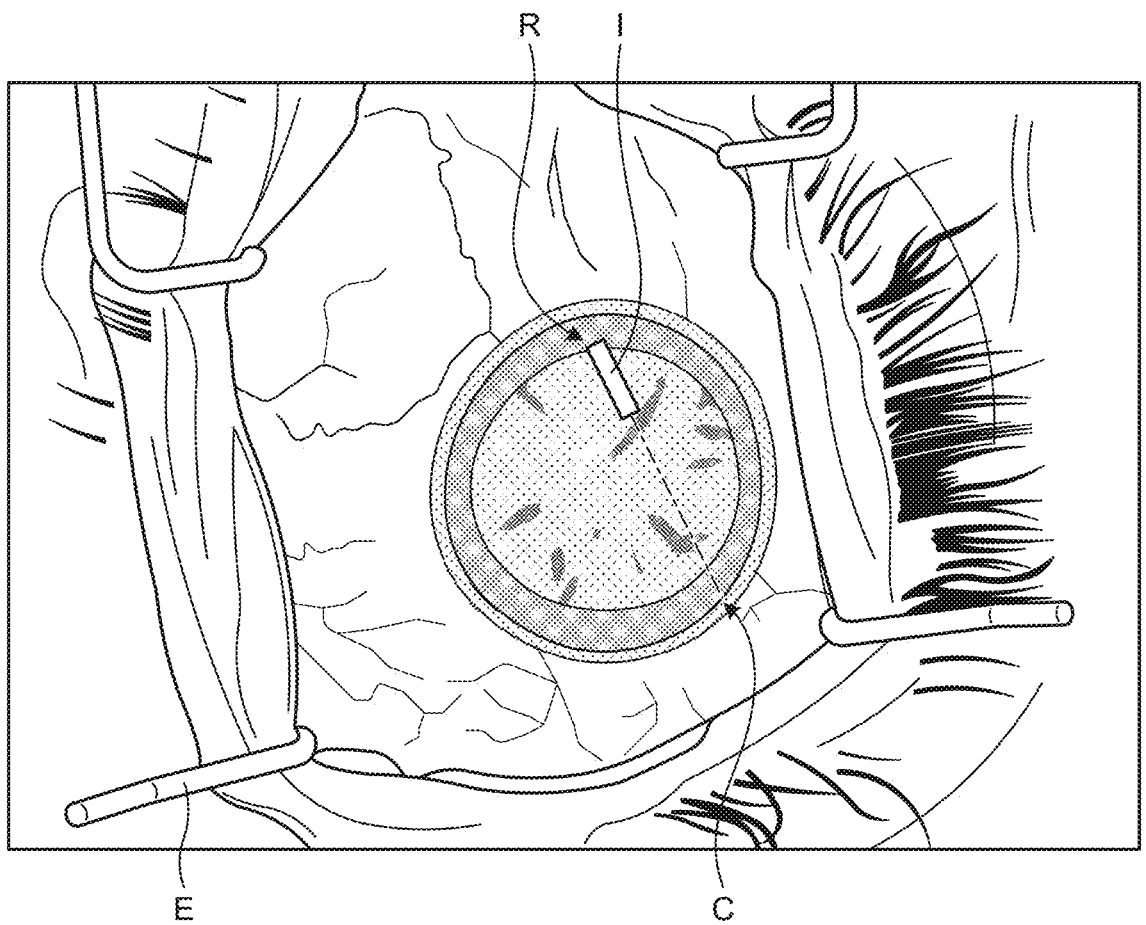
FIG. 8 is a view schematically illustrating an example of estimation of the position of the opening of the implant.

In the example illustrated in FIG. 8, the estimation unit 72 estimates an angle region with which (for example, a front end in the insertion direction of) the implant I is in contact at the time of insertion, as the position of the opening O, out of the angle region. This is because there is a high possibility that the corneal region in contact with the implant I is the implant insertion region.

Figure 9:
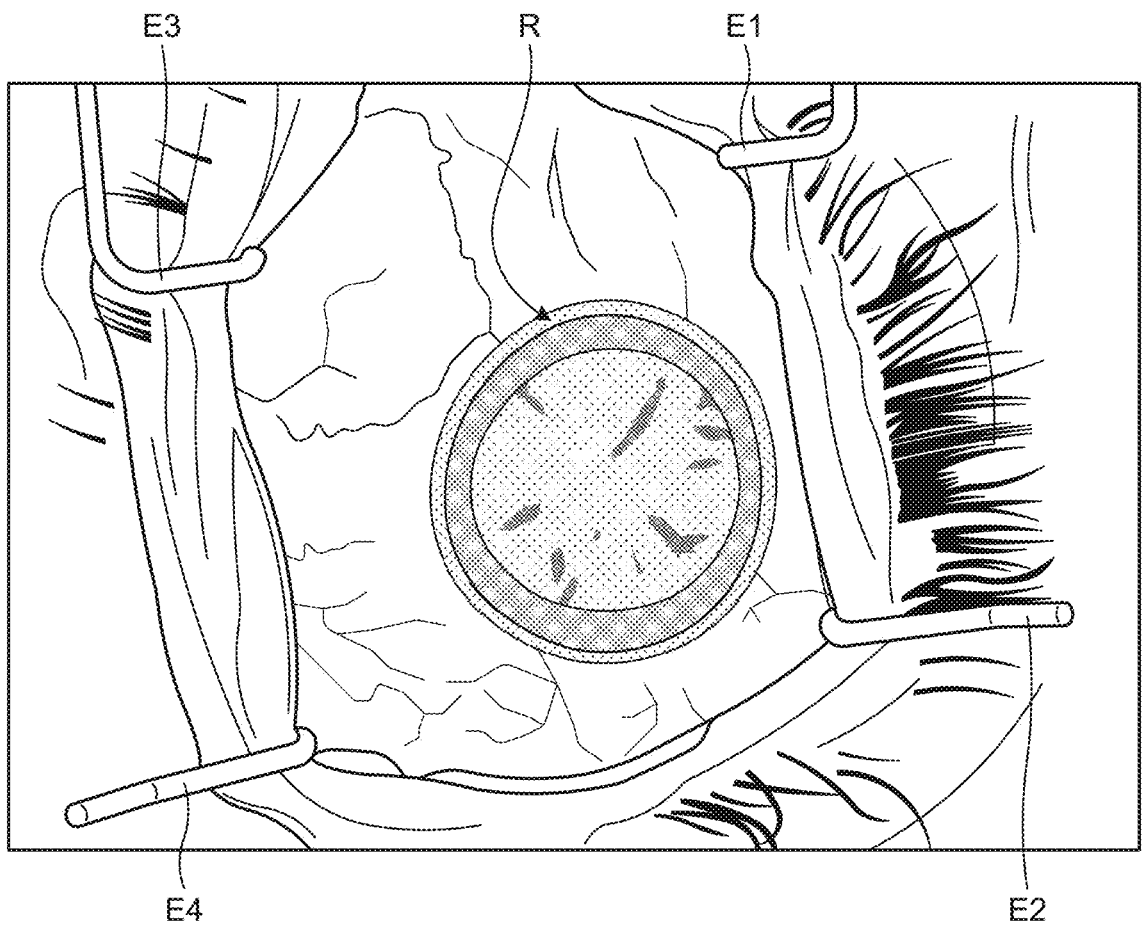
FIG. 9 is a view schematically illustrating an example of estimation of the position of the opening of the implant.

In the example illustrated in FIG. 9, the estimation unit 72 estimates the angle region R determined depending on the arrangement of the eyelid opener E, as the position of the opening O, out of the angle region. This is because there is a certain relationship between the arrangement of the eyelid opener and the implant insertion region in many cases. For example, an angle region located in a nose side direction, an angle region located in a nose lower side direction, or the like out of the angle region estimated from an orientation of the eyelid opener may be the implant insertion region.

In this example, the eyelid opener E is fixed at four points of fixed points E1 to E4 so as to maintain an eyelid opening state. When the eye is viewed from the front, the fixed point E1 corresponds to the upper left of the eyelid. The fixed point E2 corresponds to the upper right of the eyelid. The fixed point E3 corresponds to the lower left of the eyelid.

The fixing portion E4 corresponds to the lower right of the eyelid. In this example, a position corresponding a region between the fixed point E1 and the fixed point E3 is the implant insertion region, and thus, the estimation unit 72 estimates this position as the position of the opening O. Note that the relationship between the arrangement of the eyelid opener E and the implant insertion region may vary depending on whether the eye is a right eye or a left eye, a surgical style of the operator, or the like.

Although not illustrated, the estimation unit 72 may estimate an angle region located in a specific direction in the microscopic image, as the position of the opening, out of the angle region. This is because there is a certain relationship between an orientation of the microscopic image (surgical field image) and the implant insertion region in many cases. For example, an upper angle region in the microscopic image is estimated as the position of the opening. Note that the relationship between the arrangement of the eyelid opener E and the implant insertion region may vary depending on a surgical style of the operator, or the like.

Although not shown, when an opening of the implant is shown in the microscopic image (for example, in the case of the microscopic image as illustrated in FIG. 5), the estimation unit 72 may naturally estimate (in this case, detect) the opening as the position of the opening of the implant.

Meanwhile, the state of the surgical field observed as the microscopic image or the like varies during surgery. For example, a position, a posture (orientation), and the like of the eye change, and the observed state of the surgical field also changes accordingly. In addition, a specific site of the eye can be visually recognized or is not visually recognizable, and the observed state of the surgical field changes accordingly.

In one embodiment, the estimation unit 72 estimates the situation of the surgical field based on a plurality of microscopic images captured in different observation states. For example, the estimation unit 72 performs pattern matching of a site of the eye shown in each of the plurality of microscopic images. An example of the pattern matching is matching between the eyes shown in the microscopic images captured at different times using a pattern of a blood vessel, an iris, or the like. The estimation unit 72 may estimate positions and postures of the eye at the respective times (in the respective observation states) based on such pattern matching and manage estimation results of relative positional relationships of the surgical tool, the implant, and the like with respect to the eye in a consistent coordinate system. The estimation unit 72 may estimate the situation of the surgical field based on the positions and postures of the eye managed and estimated in the consistent coordinate system. This enables the estimation adapted to a change in the observation state.

A specific example of the change in the observation state will be described. Insertion and placement of the implant into the angle region are performed using the gonioscope. This starts without the gonioscope initially. Thereafter, the gonioscope is installed, and the implant is inserted and placed while observing an angle. Thereafter, the placement position of the implant is confirmed in many cases. The placement position confirmation is performed (1) in a state in which the gonioscope is installed, (2) in a state in which the gonioscope is removed and a posture of the eye with respect to a microscope lens barrel has not changed, and further (3) in a state in which the posture of the eye with respect to the microscope lens barrel has changed, and the like. When the posture of the eye in each of the states is grasped using the pattern matching as described above, it is possible to perform appropriate estimation of the surgical field situation for all of the states (1) to (3), and further perform tomographic imaging (described later) based on estimation results thereof.

For example, many operators make an incision with a knife or the like before installing the gonioscope, and insert, from the incision, an implant insertion surgical tool attached with the implant. Thereafter, the gonioscope is installed at an intermediate position while the implant insertion surgical tool passes through the anterior chamber. This is because light does not come out from an interface between the cornea and the air so that it is difficult to observe the angle unless the gonioscope is installed. Finally, the implant insertion surgical tool reaches the lower part of the scleral spur in an implant placement region (angle region), and the implant is inserted and placed in the suprachoroidal space from this position. After the final placement, it is assumed that the estimation accuracy of the position of the opening O is the highest if the opening O in the microscopic image can be visually recognized in a state where the visibility of the blood vessel and the iris for the above-described pattern matching (alignment) is high. However, an appearance of the surgical field greatly changes depending on a method of surgery of the operator or the like, and thus, it is desirable to prepare various methods as described in the present disclosure for the estimation the position of the opening O.

The estimation unit 72 may estimate the situation of the surgical field at a timing specified by a user operation although not illustrated. The estimation of the situation of the surgical field requires a high processing cost, and the difficulty of the estimation of the situation of the surgical field changes depending on various states of the surgical field. If the operator can obtain an estimation execution instruction with a foot switch, voice, or the like at a timing when the situation estimation is easy and information effective for the subsequent tomographic imaging can be obtained, it is possible to confirm (detect) the position of the implant with high accuracy based on a highly accurate estimation result while reducing the processing cost and allocating processing resources to other processing (for example, image quality improvement). Examples of the timing at which the effective information can be obtained include a timing at which the eye is captured from the front in a state where the blood vessel and the iris are focused, a timing at which the eye is tilted for installation of the gonioscope, and a timing at which the gonioscope is installed. The user operation is received by the UI unit 42, for example.

Returning to FIG. 3, the imaging control unit 73 controls imaging such that a tomographic image is captured based on the estimation result of the estimation unit 72. Specifically, the imaging control unit 73 controls the tomographic image capturing unit 62 such that the tomographic image including the implant is captured by the tomographic image capturing unit 62. The acquisition unit 71 acquires the captured tomographic image. Since the position of the opening O of the implant has been estimated, the tomographic image is captured so as to include the implant assumed from the position. As described above, the tomographic image of the implant is used for, for example, detection of the implant being appropriately inserted and placed, and confirmation (detection of the position of the implant). Since the detection efficiency of the implant can change depending on a cross-sectional direction of the tomographic image according to a type of the implant or the like, an imaging method that easily increases the detection efficiency may be appropriately selected and adopted. Some specific examples of the imaging method will be described.

FIGS. 10 to 14 are views schematically illustrating examples of imaging control of a tomographic image. A surgical field when the eye is fixed in an opened state by the eyelid opener E is illustrated in illustrated microscopic images similarly to FIGS. 6 to 9 described above.

Figure 10:
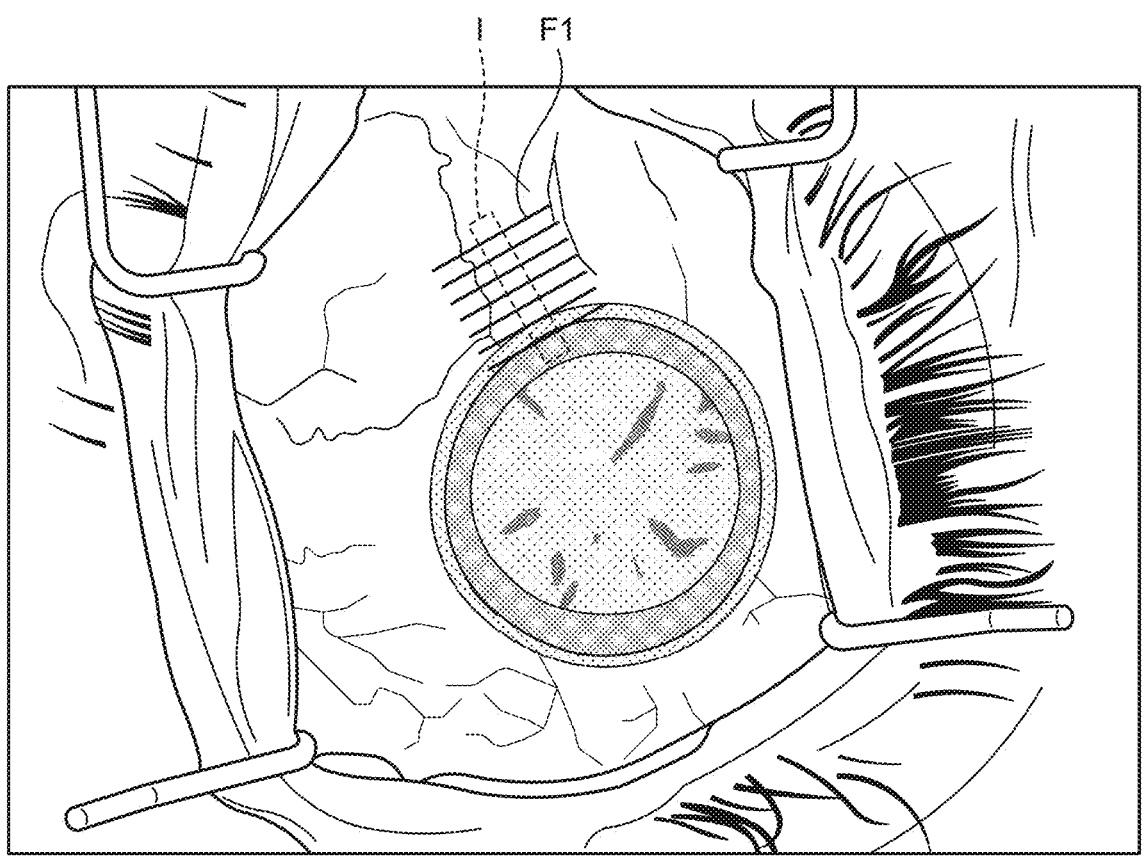
FIG. 10 is a view schematically illustrating an example of imaging control of a tomographic image.
Figure 11:
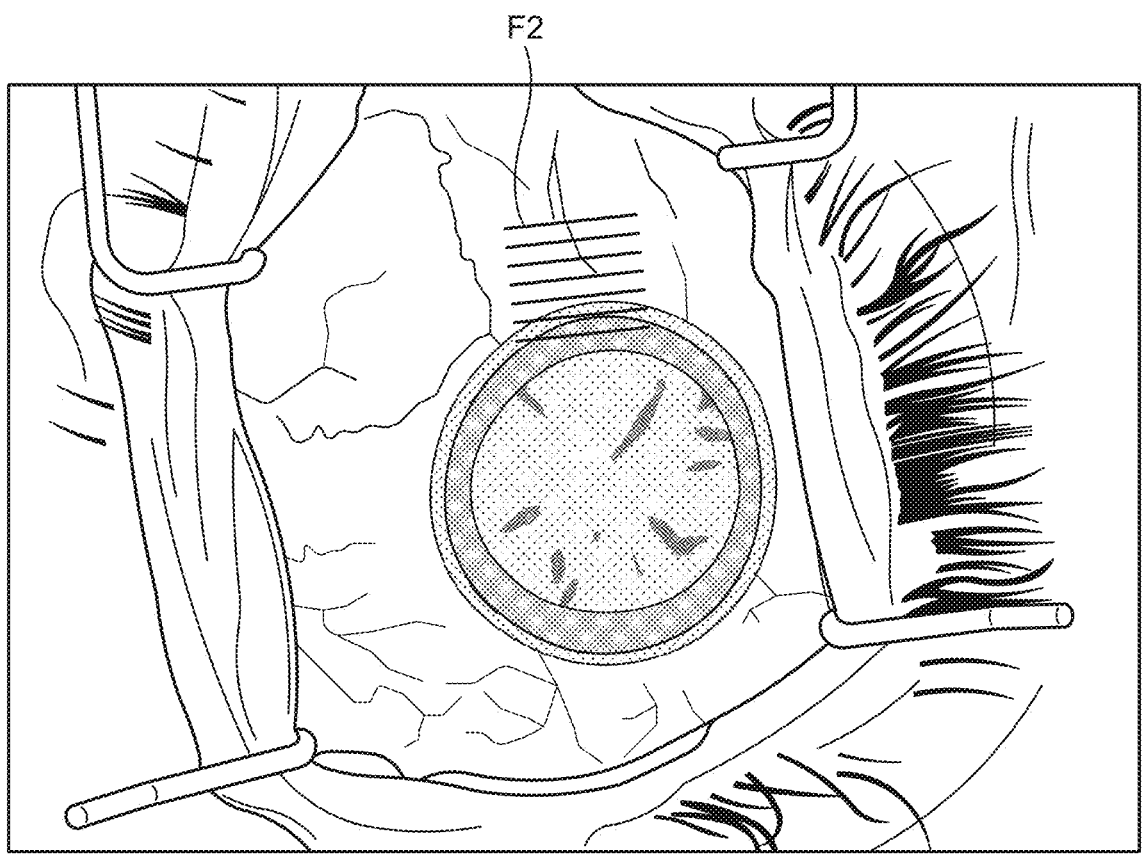
FIG. 11 is a view schematically illustrating an example of imaging control of the tomographic image.

The control illustrated in FIGS. 10 and 11 is intended to capture a tomographic image which has a direction intersecting an extending direction of the implant as a layer direction. In the example illustrated in FIG. 10, the imaging control unit 73 controls imaging such that a tomographic image, which has a direction orthogonal to an assumed extending direction of the implant I (illustrated by a broken line) as a layer direction, is captured. The layer direction of the tomographic image thus captured is referred to as a layer direction F1 and illustrated in the drawing. As the extending direction of the implant, for example, the progressing direction of the implant I when the implant I is inserted into the eye (at the time of insertion), a direction connecting the incision and the estimated opening O, or the like can be used. In this example, scanning is performed in a direction orthogonal to the layer direction F1 so as to capture a plurality of the tomographic images in the layer direction F1.

In the example illustrated in FIG. 11, the imaging control unit 73 controls imaging such that a tomographic image which has a tangential direction of the angle region as a layer direction is captured. The layer direction of the tomographic image thus captured is referred to as a layer direction F2 and is illustrated in the drawing. In this example, scanning is performed in a direction orthogonal to the layer direction F2 so as to capture a plurality of the tomographic images in the layer direction F2.

Figure 12:
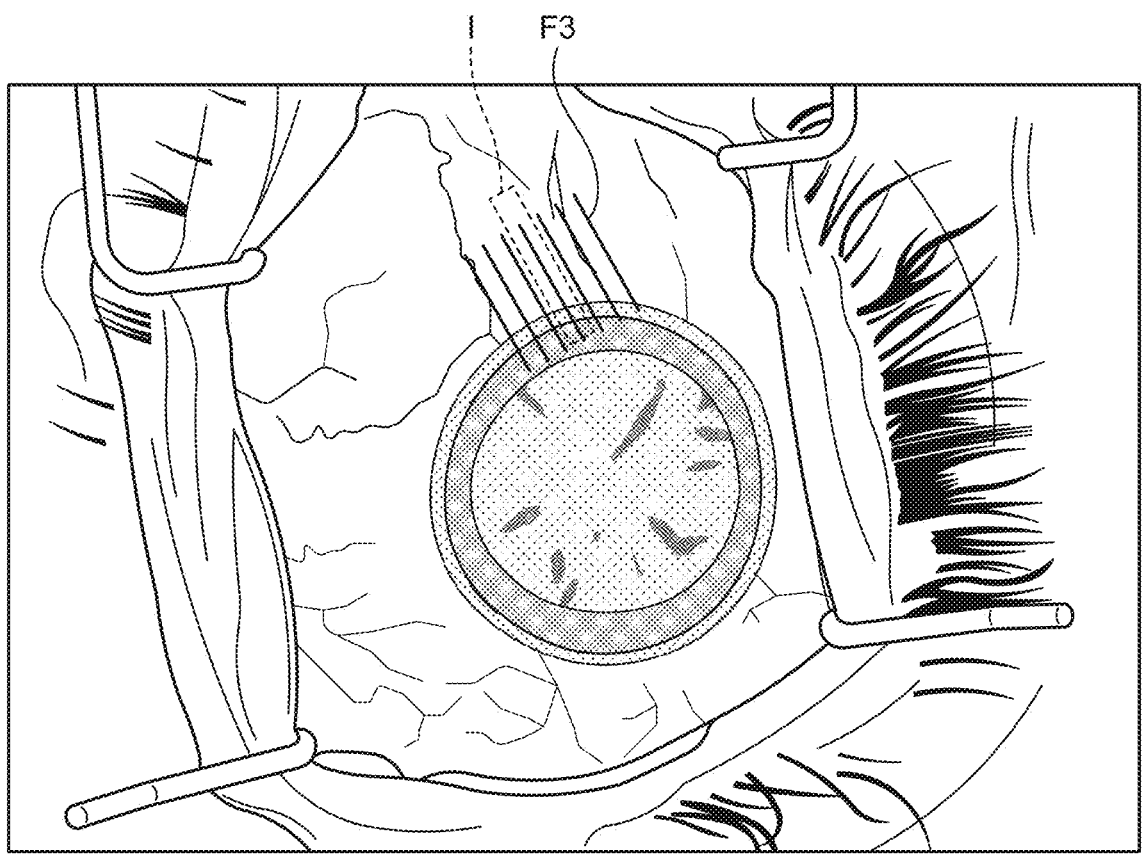
FIG. 12 is a view schematically illustrating an example of imaging control of the tomographic image.
Figure 13:
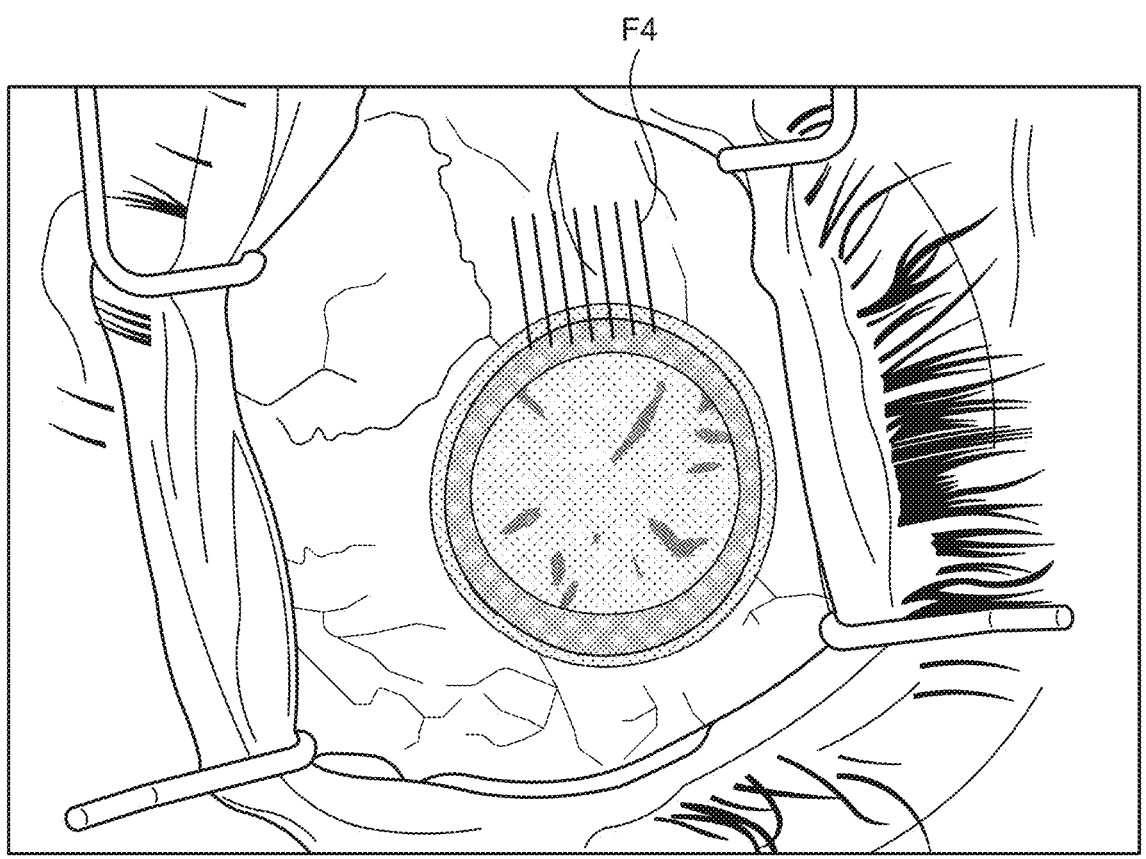
FIG. 13 is a view schematically illustrating an example of imaging control of the tomographic image.

The control illustrated in FIGS. 12 and 13 is intended to capture a tomographic image which has an extension direction of the implant as a layer direction. In the example illustrated in FIG. 12, the imaging control unit 73 controls imaging such that a tomographic image, which has an assumed extending direction of the implant I (illustrated by a broken line) as a layer direction, is captured. The layer direction of the tomographic image thus captured is referred to as a layer direction F3 and is illustrated in the drawing. As the extending direction of the implant, for example, the progressing direction of the implant I when the implant I is inserted into the eye (at the time of insertion), a direction connecting the incision and the estimated opening O, or the like can be used. In this example, scanning is performed in a direction orthogonal to the layer direction F3 so as to capture a plurality of the tomographic images in the layer direction F3.

In the example illustrated in FIG. 13, the imaging control unit 73 controls imaging such that a tomographic image which has a direction orthogonal to the tangential direction of the angle region as a layer direction is captured. The layer direction of the tomographic image thus captured is referred to as a layer direction F4 and is illustrated in the drawing. In this example, scanning is performed in a direction orthogonal to the layer direction F4 so as to capture a plurality of the tomographic images in the layer direction F4.

Figure 14:
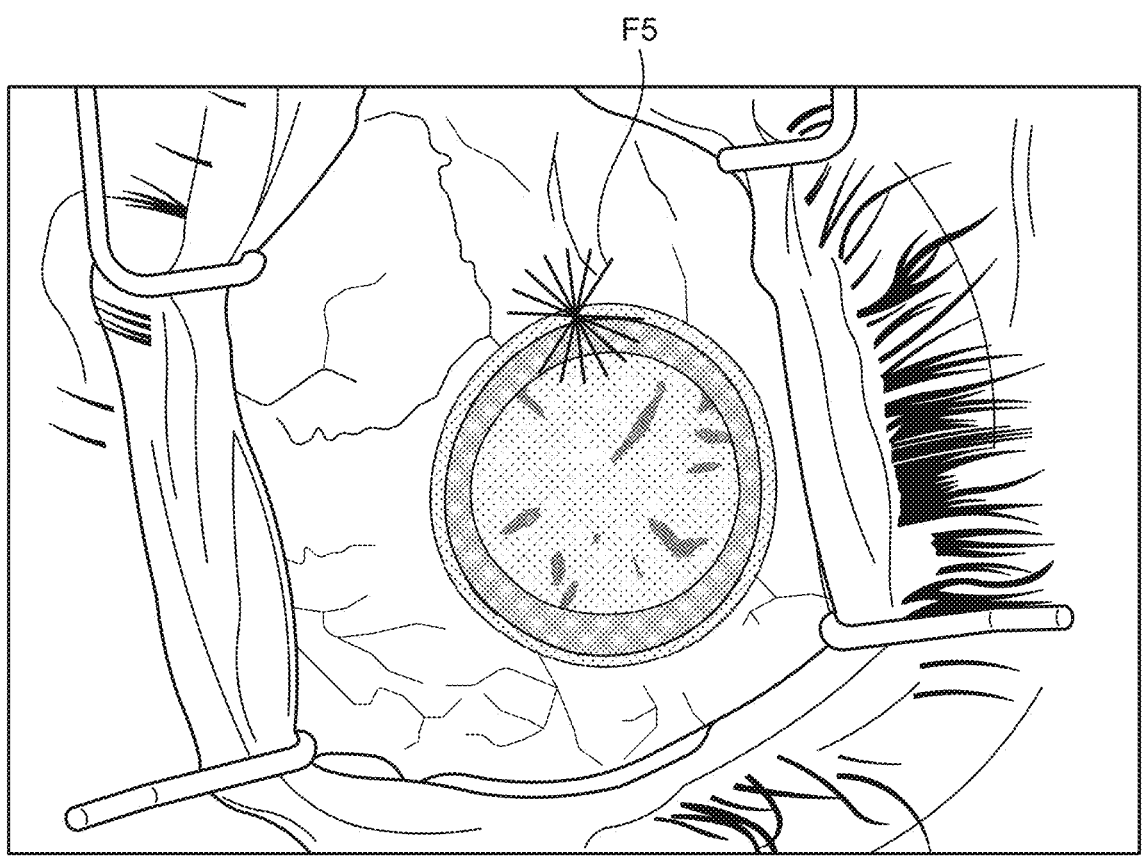
FIG. 14 is a view schematically illustrating an example of imaging control of the tomographic image.

In the example illustrated in FIG. 14, the imaging control unit 73 controls imaging such that a plurality of tomographic images having different layer directions are captured by scanning in a direction of rotating the layer direction. The layer direction of the tomographic image thus captured is referred to as a layer direction F5 and is illustrated in the drawing. For example, the estimated position of the opening O may be used as the center of rotation.

For example, tomographic images in various cross-sectional directions are captured so as to include the implant as described above. Some examples of the tomographic images will be described with reference to FIGS. 15 to 18.

Figure 15:
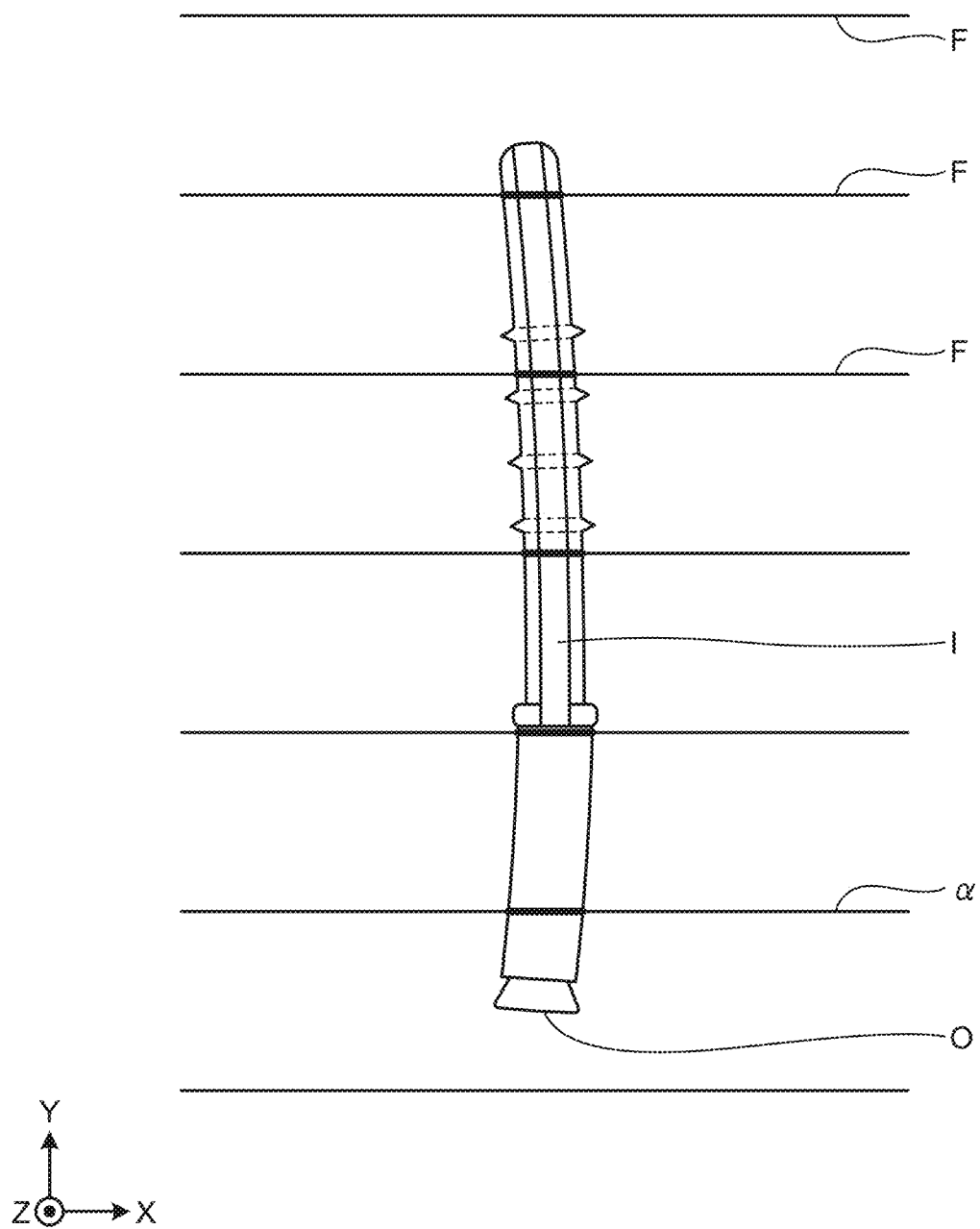
FIG. 15 is a view schematically illustrating an example of the tomographic image.
Figure 16:
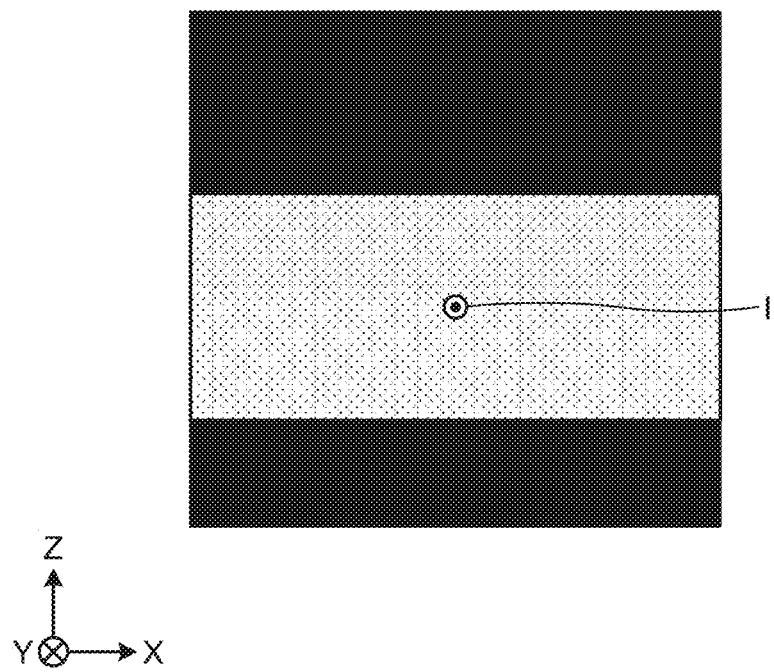
FIG. 16 is a view schematically illustrating an example of the tomographic image.
Figure 17:
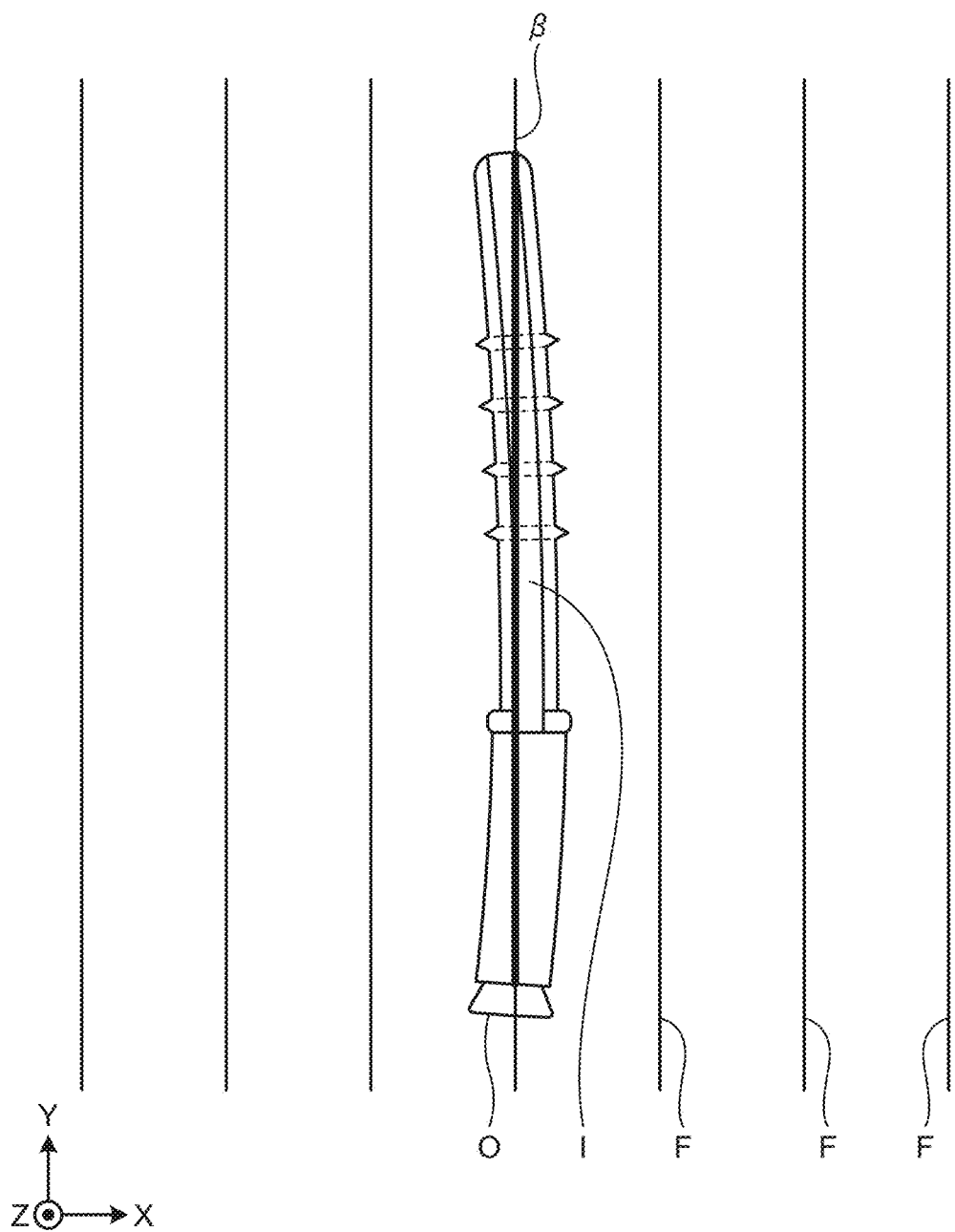
FIG. 17 is a view schematically illustrating an example of the tomographic image.
Figure 18:
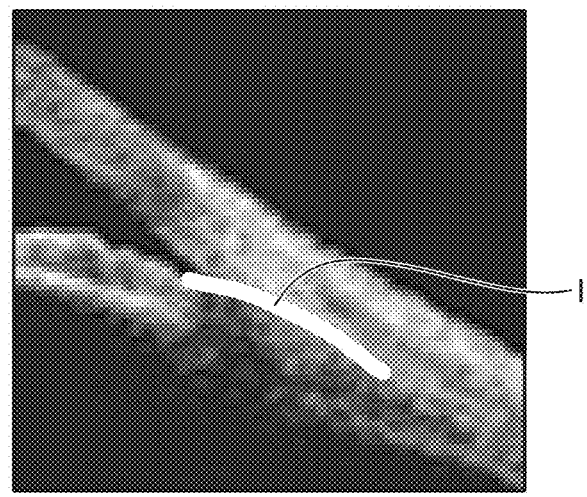
FIG. 18 is a view schematically illustrating an example of the tomographic image.
Figure 18:
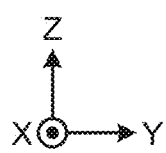

FIGS. 15 to 18 are views schematically illustrating the examples of the tomographic images. In the example illustrated in FIG. 15, imaging is performed in which a direction intersecting the extending direction of the implant I is set as the layer direction of the tomographic image. A portion where the implant I is present in a cross section is illustrated by a thick line for ease of understanding. FIG. 16 illustrates the tomographic image in the layer direction F at a cross-sectional position a in the layer direction F. In the example illustrated in FIG. 17, imaging is performed in which the extending direction of the implant I is set as the layer direction of the tomographic image. For example, FIG. 18 illustrates the tomographic image in the layer direction F at a cross-sectional position β in the layer direction F. When positions of the implant I in these tomographic images are detected, the placement position of the implant I can be detected. The detection (confirmation) of the placement position of the implant I in the tomographic image may be performed by known image recognition processing of surgery or the like, or may be performed as the user confirms the tomographic image displayed on the monitor of the UI unit 42.

In order to further improve the detection accuracy of the placement position of the implant using the tomographic image, additional imaging control may be performed by the imaging control unit 73 based on an already captured tomographic image. In a case where it is estimated that the implant is not included in the already captured tomographic image, the imaging control unit 73 controls imaging such that an additional tomographic image is captured. For example, it is estimated that the implant is not included in the already captured tomographic image in a case where the implant is not detected by the image recognition processing on the already captured tomographic image or a case where the implant has been detected but not appropriately captured. This estimation determination may be performed automatically or via a user operation.

In the case of capturing an additional tomographic image, the imaging control unit 73 may control imaging such that a tomographic image at a position adjacent to an imaging target position of the already captured tomographic image is captured. Alternatively, the estimation unit 72 may estimate a position of the opening O by another estimation method, and the imaging control unit 73 may control imaging based on a result of the estimation. Such processing may be repeated until the position of the implant is appropriately detected.

When there is only one estimated position of the opening O, the position of the implant is not detectable in a case where the estimation is wrong. However, the position of the implant can be reliably detected by capturing tomographic images of adjacent positions as described above or capturing tomographic images based on different estimation results (combining a plurality of estimations).

The imaging control unit 73 may control imaging such that a scanning interval of a plurality of tomographic images becomes narrower as the degree of inclusion of the implant in the tomographic image increases. It is possible to efficiently and accurately detect the position of the implant by sequentially performing scanning more finely.

According to the control system 1 described above, the estimation unit 72 of the control device 7 estimates the position of the opening O of the implant (particularly, the implant for MIGS) based on, for example, the microscopic images between the start of the surgery and the time of confirmation of an implant placement result. Under the control of the imaging control unit 73, the cross-sectional position is scanned in the vicinity of the estimated position of the opening O to capture the tomographic image. The acquisition unit 71 acquires the captured tomographic image. The imaging control unit 73 detects the placement position of the implant by performing the image recognition or the like on the tomographic image. If necessary, further control is performed such that a tomographic image related to the placement position detected by the imaging control unit 73 is captured. In this manner, it is possible to simply and efficiently confirm whether or not the implant has been appropriately placed.

Figure 19:
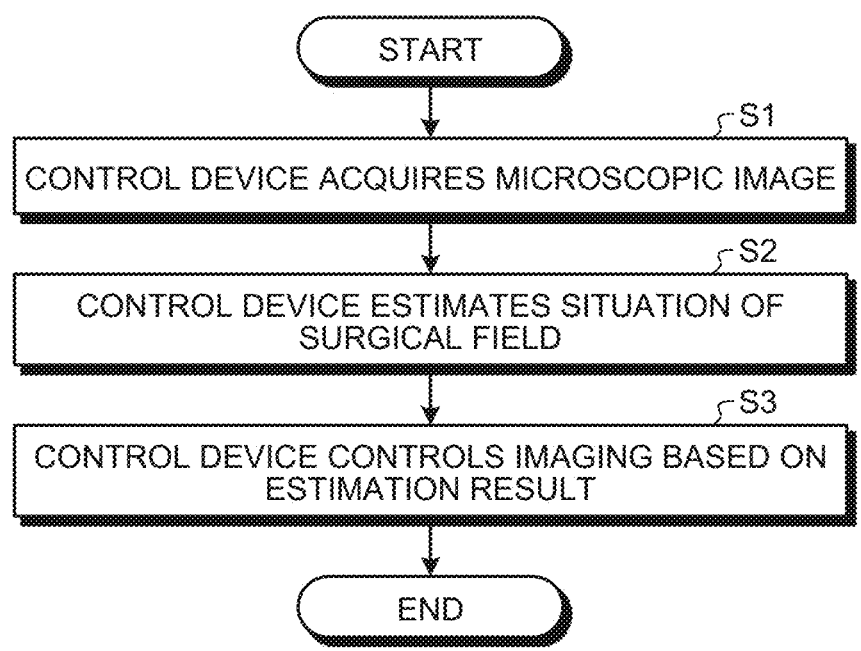
FIG. 19 is a flowchart illustrating an example of processing executed in the control device.

FIG. 19 is a flowchart illustrating an example of processing (a control method and an operating method of the control device) executed in the control device. Since the specific processing is the same as described above, the description will not be repeated.

In Step S1, the control device 7 acquires a microscopic image. The acquisition unit 71 of the control device 7 acquires the microscopic image as described above.

In Step S2, the control device 7 estimates a situation of a surgical field. The estimation unit 72 of the control device 7 estimates the situation of the surgical field (for example, a position of the opening O of an implant) based on an acquisition result (for example, the microscopic image) in Step S1 described above.

In Step S3, the control device 7 controls imaging based on an estimation result. The imaging control unit 73 of the control device 7 controls the tomographic image capturing unit 62 such that a tomographic image including the implant is captured based on the estimation result in Step S3 described above.

3. Example of Hardware Configuration

Figure 20:
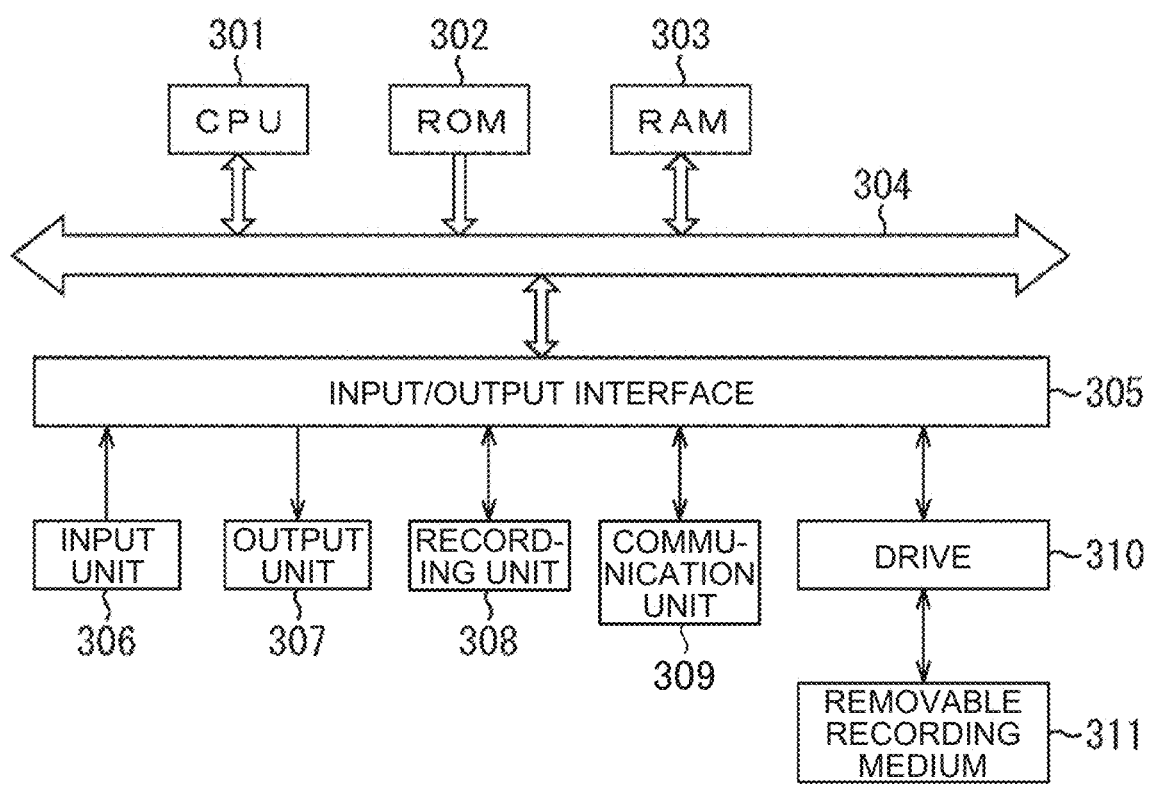
FIG. 20 is a diagram illustrating an example of a hardware configuration of the device.

FIG. 20 is a diagram illustrating an example of a hardware configuration of the device. The control device 7 described above may be achieved by, for example, software (program) that causes a computer to function as the control device 7.

In the computer, a central processing unit (CPU) 301, a read only memory (ROM) 302, and a random access memory (RAM) 303 are connected to each other by a bus 304.

An input/output interface 305 is further connected to the bus 304. An input unit 306, an output unit 307, a recording unit 308, a communication unit 309, and a drive 310 are connected to the input/output interface 305.

The input unit 306 includes a keyboard, a mouse, a microphone, an imaging element, and the like. The output unit 307 includes a display, a speaker, and the like. The recording unit 308 includes a hard disk, a nonvolatile memory, and the like. The communication unit 309 includes a network interface and the like. The drive 310 drives a removable recording medium 311 such as a magnetic disk, an optical disk, a magneto-optical disk, or a semiconductor memory.

In the computer configured as described above, for example, the CPU 301 loads a program recorded in the recording unit 308 into the RAM 303 via the input/output interface 305 and the bus 304 and executes the program, whereby the control of the control device 7 described above is executed.

The program executed by the computer (CPU 301) can be provided by being recorded on the removable recording medium 311 as, for example, a package medium or the like. In addition, the program can be provided via a wired or wireless transmission medium such as a local region network, the Internet, or digital satellite broadcasting.

In the computer, the program can be installed in the recording unit 308 via the input/output interface 305 by attaching the removable recording medium 311 to the drive 310. In addition, the program can be received by the communication unit 309 via a wired or wireless transmission medium and installed in the recording unit 308. Moreover, the program can be installed in the ROM 302 or the recording unit 308 in advance.

4. Modifications

The disclosed technology is not limited to the above embodiment. Some modifications will be described.

Although the implant for MIGS placed in the suprachoroidal space has been mainly described in the above embodiment, the implant may be various other implants for MIGS. Examples of other implants for MIGS include an implant that connects the anterior chamber and the subconjunctiva, an implant that bypasses the trabecular meshwork, and an implant that expands the Schlemm's canal.

In addition, the example in which the implant is the implant for minimally invasive glaucoma surgery (MIGS) has been described in the above embodiment. However, the implant may be implants for various other types of ophthalmic surgery. Examples of the other surgeries include retinal vitreous surgery.

The components of the control system 1, the components of the control device 7, and the like may be housed in separate housings and connected via a network. For example, a cloud computing configuration may be adopted in which one function is shared and processed by a plurality of devices in cooperation via the network.

5. Example of Effects

The control device 7 described above is specified as follows, for example. As described with reference to FIGS. 1 to 3 and the like, the control device 7 includes the acquisition unit 71, the estimation unit 72, and the imaging control unit 73. The acquisition unit 71 acquires the microscopic image in the surgery for placing the implant in the eye. The estimation unit 72 estimates the situation of the surgical field based on the acquisition result of the acquisition unit 71. The imaging control unit 73 controls imaging such that the tomographic image including the implant is captured based on the estimation result of the estimation unit 72.

According to the control device 7 described above, for example, the situation of the surgical field is estimated based on the microscopic image, and the tomographic image including the implant is captured based on the estimation result. Therefore, it is possible to capture the tomographic image appropriately including the implant.

As described with reference to FIGS. 4 and 5 and the like, the surgery is surgery (for example, MIGS) for inserting and placing the implant in the angle region, and the estimation unit 72 may estimate the position of the opening O at the rear end in the insertion direction of the implant in the angle region. As a result, it is possible to capture the tomographic image including the implant placed in a hidden manner in the tissue that does not transmit visible light.

As described with reference to FIG. 6 and the like, the estimation unit 72 may estimate the angle region located at the position opposite to the incision with the corneal center interposed therebetween, as the position of the opening O of the implant, out of the angle region. As described with reference to FIG. 7 and the like, the estimation unit 72 may estimate the angle region located on the extension line of the progressing direction of the implant I when the implant I is inserted into the eye, as the position of the opening O of the implant I, out of the angle region. As described with reference to FIG. 8 and the like, the estimation unit 72 may estimate the angle region with which the implant I is in contact when the implant I is inserted into the eye, as the position of the opening O of the implant I, out of the angle region. As described with reference to FIG. 9 and the like, the estimation unit 72 may estimate the angle region determined depending on the arrangement of the eyelid opener E, as the position of the opening O of the implant, out of the angle region. The estimation unit 72 may estimate the angle region located in the specific direction in the microscopic image, as the position of the opening O of the implant, out of the angle region. For example, the position of the opening O can be estimated using such various estimation methods.

As described with reference to FIGS. 10, 15, 16, and the like, the imaging control unit 73 may control imaging such that the tomographic image, which has the direction orthogonal to the assumed extending direction of the implant I as the layer direction (for example, the layer direction F1), is captured. As described with reference to FIGS. 11, 15, 16, and the like, the imaging control unit 73 may control imaging such that the tomographic image, which has the tangential direction of the angle region as the layer direction (for example, the layer direction F2), is captured. As described with reference to FIGS. 12, 17, 18, and the like, the imaging control unit 73 may control imaging such that the tomographic image, which has the assumed extending direction of the implant I as the layer direction (for example, the layer direction F3), is captured. As described with reference to FIGS. 13, 17, 18, and the like, the imaging control unit 73 may control imaging such that the tomographic image, which has the direction orthogonal to the tangent of the angle region as the layer direction (for example, the layer direction F4), is captured. These types of imaging may be subjected to imaging control such that a plurality of tomographic images in the same layer direction are captured by scanning in a direction orthogonal to the layer direction. As described with reference to FIG. 14 and the like, the imaging control unit 73 may control imaging such that the plurality of tomographic images having different layer directions are captured by the scanning in the direction of rotating the layer direction (for example, the layer direction F5). For example, the tomographic image including the implant can be captured using such various imaging methods.

When it is estimated that the implant is not included in the already captured tomographic image, the imaging control unit 73 may control imaging such that the tomographic image at the position adjacent to the imaging target position of the already captured tomographic image is captured. As a result, the position of the implant can be reliably detected (confirmed).

The imaging control unit 73 may control imaging such that a scanning interval of a plurality of tomographic images becomes narrower as the degree of inclusion of the implant in the tomographic image increases. As a result, it is possible to efficiently and accurately detect the position of the implant by sequentially performing scanning more finely.

The estimation unit 72 may estimate the situation of the surgical field based on the positions and postures of the eye in the respective observation states estimated based on the pattern matching of the region of the eye shown in each of the plurality of microscopic images captured in the different observation states. This enables the estimation adapted to a change in the observation state.

The estimation unit 72 may estimate the situation of the surgical field at the timing specified by the user operation. This enables, for example, highly accurate detection of the position of the implant based on a highly accurate estimation result while reducing the processing cost and allocating the processing resources to other processing (for example, image quality improvement).

The control system 1 described with reference to FIGS. 1 to 3 and the like is also an aspect of the present disclosure. The control system 1 includes: an imaging unit (for example, the front image capturing unit 61 and the tomographic image capturing unit 62) that captures the microscopic image and the tomographic image in the surgery for placing the implant in the eye; and the control device 7. The control device 7 includes: the acquisition unit 71 that acquires the microscopic image captured by the imaging unit; the estimation unit 72 that estimates the situation of the surgical field based on the acquisition result of the acquisition unit 71; and the imaging control unit 73 that controls the imaging unit such that the tomographic image including the implant is captured based on the estimation result of the estimation unit 72. Such a control system 1 also enables capturing of the tomographic image appropriately including the implant as described above.

The control method described with reference to FIG. 19 and the like is also an aspect of the present disclosure. The control method includes: acquiring, by the control device 7, the microscopic image in the surgery for placing the implant in the eye (Step S1); estimating, by the control device 7, the situation of the surgical field based on the acquisition result (Step S2); and controlling, by the control device 7, imaging such that the tomographic image including the implant is captured based on the estimation result (Step S3). Such a control method also enables capturing of the tomographic image appropriately including the implant as described above.

Note that the effects described in the present disclosure are merely examples and are not limited to the disclosed content. There may be other effects.

Although the above description is given regarding the embodiments of the present disclosure, the technical scope of the present disclosure is not limited to the above-described embodiments as they are, and various modifications can be made without departing from the scope of the present disclosure. In addition, the components in different embodiments and modifications can be combined suitably.

Note that the present technology can also have the following configurations.

(1) A control device comprising:
  an acquisition unit that acquires a microscopic image in surgery for placing an implant in an eye;
  an estimation unit that estimates a situation of a surgical field based on an acquisition result of the acquisition unit; and
  an imaging control unit that controls imaging such that a tomographic image including the implant is captured based on an estimation result of the estimation unit.

(2) The control device according to (1), wherein
  the surgery is surgery for inserting and placing the implant in an angle region, and the estimation unit estimates a position of an opening at a rear end in an insertion direction of the implant in the angle region.

(3) The control device according to (2), wherein
the estimation unit estimates an angle region located at a position opposite to an incision with a corneal center interposed between the angle region and the incision, as the position of the opening of the implant, out of the angle region.

(4) The control device according to (2) or (3), wherein
the estimation unit estimates an angle region located on an extension line of a progressing direction of the implant when the implant is inserted into the eye, as the position of the opening of the implant, out of the angle region.

(5) The control device according to any one of (2) to (4), wherein
the estimation unit estimates an angle region with which the implant is in contact when the implant is inserted into the eye, as the position of the opening of the implant, out of the angle region.

(6) The control device according to any one of (2) to (5), wherein
the estimation unit estimates an angle region determined depending on an arrangement of an eyelid opener, as the position of the opening of the implant, out of angle region.

(7) The control device according to any one of (2) to (6), wherein
the estimation unit estimates an angle region located in a specific direction in the microscopic image, as the position of the opening of the implant, out of the angle region.

(8) The control device according to any one of (1) to (7), wherein
the imaging control unit controls imaging such that a tomographic image, which has a direction orthogonal to an assumed extending direction of the implant as a layer direction, is captured.

(9) The control device according to any one of (1) to (7), wherein
the imaging control unit controls imaging such that a tomographic image, which has a tangential direction of the angle region as a layer direction, is captured.

(10) The control device according to any one of (1) to (7), wherein
the imaging control unit controls imaging such that a tomographic image, which has an assumed extending direction of the implant as a layer direction, is captured.

(11) The control device according to any one of (1) to (7), wherein
the imaging control unit controls imaging such that a tomographic image, which has a direction orthogonal to a tangent of the angle region as a layer direction, is captured.

(12) The control device according to any one of (1) to (11), wherein
the imaging control unit controls imaging such that a plurality of tomographic images in a same layer direction are captured by scanning in a direction orthogonal to the layer direction.

(13) The control device according to any one of (1) to (11), wherein
the imaging control unit controls imaging such that a plurality of tomographic images having different layer directions are captured by scanning in a direction of rotating the layer direction.

(14) The control device according to any one of (1) to (13), wherein
when it is estimated that the implant is not included in an already captured tomographic image, the imaging control unit controls imaging such that a tomographic image at a position adjacent to an imaging target position of the already captured tomographic image is captured.

(15) The control device according to any one of (1) to (14), wherein
the imaging control unit controls imaging such that a scanning interval of a plurality of tomographic images becomes narrower as a degree of inclusion of the implant in the tomographic image increases.

(16) The control device according to any one of (1) to (15), wherein
the estimation unit estimates the situation of the surgical field based on a position and a posture of the eye in each of observation states estimated based on pattern matching of a site of the eye shown in each of a plurality of microscopic images captured in the observation states which are different from each other.

(17) The control device according to any one of (1) to (16), wherein
the estimation unit estimates the situation of the surgical field at a timing specified by a user operation.

(18) A control system comprising:
an imaging unit that captures a microscopic image and a tomographic image in a surgery for placing an implant in an eye; and
a control device,
wherein the control device includes
an acquisition unit that acquires the microscopic image captured by the imaging unit,
an estimation unit that estimates a situation of a surgical field based on an acquisition result of the acquisition unit, and
an imaging control unit that controls the imaging unit such that the tomographic image including the implant is captured based on an estimation result of the estimation unit.

(19) A control method comprising:
acquiring, by a control device, a microscopic image in a surgery for placing an implant in an eye;
estimating, by the control device, a situation of a surgical field based on an acquisition result; and
controlling imaging, by the control device, such that a tomographic image including the implant is captured based on an estimation result.

REFERENCE SIGNS LIST

1 CONTROL SYSTEM
2 LIGHT SOURCE
3 OBSERVATION OPTICAL SYSTEM
41 PRESENTATION UNIT
42 UI UNIT
5 EYEPIECE LENS
61 FRONT IMAGE CAPTURING UNIT
62 TOMOGRAPHIC IMAGE CAPTURING UNIT
7 CONTROL DEVICE
71 ACQUISITION UNIT
72 ESTIMATION UNIT
73 IMAGING CONTROL UNIT

301 CPU
302 ROM
303 RAM
304 BUS
305 INPUT/OUTPUT INTERFACE
306 INPUT UNIT
307 OUTPUT UNIT
308 RECORDING UNIT
309 COMMUNICATION UNIT
310 DRIVE
311 REMOVABLE RECORDING MEDIUM

The invention claimed is:

1. A control device, comprising:
an acquisition unit configured to acquire a microscopic image in a surgery of an eye, wherein the surgery is for insertion and placement of an implant in a first angle region of the eye;
an estimation unit configured to:
estimate a situation of a surgical field based on an acquisition result of the acquisition unit, wherein the situation corresponds to a first position of an opening at a rear end in an insertion direction of the implant in the first angle region; and
estimate a second angle region, based on an arrangement of an eyelid opener, as the first position of the opening of the implant, wherein the second angle region is different from the first angle region; and
an imaging control unit configured to capture a first tomographic image of a plurality of tomographic images based on an estimation result of the estimation unit, wherein the first tomographic image includes the implant.

2. The control device according to claim 1, wherein
the estimation unit is further configured to estimate a third angle region, located at a second position opposite to an incision with a corneal center between the first angle region and the incision, as the first position of the opening of the implant, and
the third angle region is different from the first angle region.

3. The control device according to claim 1, wherein the estimation unit is further configured to estimate a fourth angle region, located on an extension line of a progressing direction of the implant in a case where the implant is inserted into the eye, as the first position of the opening of the implant, and
the fourth angle region is different from the first angle region.

4. The control device according to claim 1, wherein
the estimation unit is further configured to estimate a fifth angle region with which the implant is in contact, in a case where the implant is inserted into the eye, as the first position of the opening of the implant, and
the fifth angle region is different from the first angle region.

5. The control device according to claim 1, wherein
the estimation unit is further configured to estimate a sixth angle region, located in a specific direction in the microscopic image, as the first position of the opening of the implant, and
the sixth angle region is different from the first angle region.

6. The control device according to claim 1, wherein
the imaging control unit is further configured to capture a second tomographic image of the plurality of tomographic images, and
the second tomographic image has a direction orthogonal to an assumed extending direction of the implant as a layer direction.

7. The control device according to claim 1, wherein
the imaging control unit is further configured to capture a third tomographic image of the plurality of tomographic images, and
the third tomographic image has a tangential direction of the first angle region as a layer direction.

8. The control device according to claim 1, wherein
the imaging control unit is further configured to capture a fourth tomographic image of the plurality of tomographic images, and
the fourth tomographic image has an assumed extending direction of the implant as a layer direction.

9. The control device according to claim 1, wherein
the imaging control unit is further configured to capture a fifth tomographic image of the plurality of tomographic images, and
the fifth tomographic image has a direction orthogonal to a tangent of the first angle region as a layer direction.

10. The control device according to claim 1, wherein
the imaging control unit is further configured to capture the plurality of tomographic images in a specific layer direction based on a scanning operation in a direction orthogonal to the specific layer direction.

11. The control device according to claim 1, wherein
the imaging control unit is further configured to capture the plurality of tomographic images, having a plurality of different layer directions, based on a scanning operation in a direction of rotation of the plurality of different layer directions.

12. The control device according to claim 1, wherein
the estimation unit is further configured to estimate that the implant is absent in the first tomographic image of the plurality of tomographic images, and
the imaging control unit is further configured to capture a sixth tomographic image of the plurality of tomographic images at a third position which is adjacent to an imaging target position of the first tomographic image.

13. The control device according to claim 1, wherein
the first tomographic image of the plurality of tomographic images is captured such that a scanning interval of the plurality of tomographic images becomes narrower as a degree of inclusion of the implant in the first tomographic image of the plurality of tomographic images increases.

14. The control device according to claim 1, wherein
the estimation unit is further configured to estimate the situation of the surgical field based on a fourth position and a posture of the eye in each of a plurality of observation states, the plurality of observation states is estimated based on pattern matching operation of a site of the eye in each of a plurality of microscopic images captured in the plurality of observation states.

15. The control device according to claim 1, wherein
the estimation unit is further configured to estimate the situation of the surgical field at a timing specified by a user operation.

16. A control system, comprising:
an imaging unit configured to capture a microscopic image and a tomographic image in a surgery of an eye, wherein the surgery is for insertion and placement of an implant in a first angle region of the eye; and a control device, wherein the control device includes:
  an acquisition unit configured to acquire the microscopic image captured by the imaging unit;
  an estimation unit configured to:
    estimate a situation of a surgical field based on an acquisition result of the acquisition unit, wherein
      the situation corresponds to a position of an opening at a rear end in an insertion direction of the implant in the first angle region; and
    estimate a second angle region, based on an arrangement of an eyelid opener, as the position of the opening of the implant, wherein the second angle region is different from the first angle region; and
  an imaging control unit configured to capture the tomographic image based on an estimation result of the estimation unit, wherein the tomographic image includes the implant.

17. A control method, comprising:
  acquiring, by a control device, a microscopic image in a surgery of an eye, wherein the surgery is for insertion and placement of an implant in a first angle region of the eye;
  estimating, by the control device, a situation of a surgical field based on an acquisition result, wherein
    the situation corresponds to a position of an opening at a rear end in an insertion direction of the implant in the first angle region;
  estimating, by the control device, a second angle region, based on an arrangement of an eyelid opener, as the position of the opening of the implant, wherein the second angle region is different from the first angle region; and
  controlling, by the control device, capture of a tomographic image based on an estimation result, wherein the tomographic image includes the implant.

* * * * *